(12) United States Patent
Ko et al.

(10) Patent No.: US 8,874,063 B2
(45) Date of Patent: Oct. 28, 2014

(54) SIMULTANEOUS SIGNAL RECEIVER WITH INTERSPERSED FREQUENCY ALLOCATION

(71) Applicant: QUALCOMM Incorporated, San Diego, CA (US)

(72) Inventors: Jin-Su Ko, San Jose, CA (US); Hong Sun Kim, San Jose, CA (US); Liang Zhao, Sunnyvale, CA (US); Cheng-Han Wang, San Jose, CA (US); Dominic Gerard Farmer, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/791,048

(22) Filed: Mar. 8, 2013

(65) Prior Publication Data

US 2014/0256278 A1     Sep. 11, 2014

(51) Int. Cl.
  *H04B 1/26* (2006.01)
  *H04B 1/16* (2006.01)
(52) U.S. Cl.
  CPC .................................. *H04B 1/16* (2013.01)
  USPC .......................................... 455/313; 455/255
(58) Field of Classification Search
  CPC .............................. H04H 60/78; H03D 3/007
  USPC ...................... 455/3.02, 137, 146, 272, 273;
                                 342/357.72, 357.73, 357.76
  See application file for complete search history.

(56) References Cited

U.S. PATENT DOCUMENTS

| 6,125,135 | A | 9/2000 | Woo et al. |
| 6,239,743 | B1 | 5/2001 | Lennen |
| 6,320,914 | B1 * | 11/2001 | Dent .............................. 375/302 |
| 7,460,615 | B2 | 12/2008 | Kunysz et al. |
| 8,209,596 | B1 | 6/2012 | Gilmour et al. |
| 2003/0007450 | A1 * | 1/2003 | Ohtaki ........................... 370/208 |
| 2003/0128068 | A1 * | 7/2003 | Behbahani et al. ........... 327/552 |
| 2010/0091688 | A1 | 4/2010 | Staszewski et al. |
| 2010/0097531 | A1 * | 4/2010 | Miura et al. ................... 348/735 |
| 2010/0265875 | A1 | 10/2010 | Zhao et al. |
| 2011/0057834 | A1 * | 3/2011 | Miller ....................... 342/357.25 |
| 2011/0057837 | A1 | 3/2011 | Lin |
| 2011/0116577 | A1 * | 5/2011 | Beamish ........................ 375/317 |

FOREIGN PATENT DOCUMENTS

EP     1793504 A2     6/2007

OTHER PUBLICATIONS

International Search Report and Written Opinion—PCT/US2014/020800—ISA/EPO—Jun. 18, 2014.

* cited by examiner

*Primary Examiner* — Creighton Smith
(74) *Attorney, Agent, or Firm* — Patterson & Sheridan, L.L.P.

(57) ABSTRACT

Methods and circuits can down convert at least a first RF signal on a first path in a first frequency band to provide a first IF signal. A second RF signal on second path in a second frequency band can be down converted to provide a second IF signal. The first IF signal and the second IF signal are interspersed in the frequency domain, and the first frequency band is different from the second frequency band. A combiner can combine at least part of the first IF signal and the second IF signal to provide a combined signal on an output signal path for reception by a digital processing circuit. The first IF signal or second IF signal can be a Zero IF (ZIF), very low IF (VLIF), or Low IF (LIF) signal.

19 Claims, 11 Drawing Sheets

SIMULTANEOUS SIGNAL RECEIVER WITH INTERSPERSED FREQUENCY ALLOCATION

FIELD

The present disclosure relates to the processing of signals in frequency bands.

BACKGROUND

Various wireless and non-wireless signals are used to communicate with devices or equipment. Signals can include but are not limited to telecommunication signals, positional signals, data communication signals, sensor signals and other types of signals. Various frequency bands are used for telecommunication signals, positional signals, data communication signals, sensor signals and other types of signals. These signals can create interference among each other based on their frequencies and other characteristics. Accordingly, conventional systems often have dedicated signal paths for signals in different frequency bands.

According to one example of signals, positional signals are used in navigation systems including, but not limited to Global Navigation Satellite System (GNSS). Types of GNSSs include the Global Positioning System (GPS), the Global Navigation Satellite System (GLONASS), the BeiDou navigation system, the Galileo position system and other regional navigation systems.

GNSSs generally use certain signal carrier frequencies for positional signals. For example, the GPS currently uses L1 and L2 signals at frequencies in the GHz range. A foreseen extension of the GPS may include an L5 signal at 1176.45 MHz. Some GLONASS signals are also located in the GHz range (e.g., GLONASS L1 (hereinafter R1) and GLONASS L2 (hereinafter R2)). Table 1 below provides parameters for the L1, L2, R1, and R2 signals. The Galileo System foresees the use of signals centered at the following frequencies: 1575.42 MHz (L1), 1589 MHz (E1), 1561 MHz (E2), 1676.45 MHz (E5a), 1207.140 MHz (E5b) and 1278.75 MHz (E6). Each of the frequency bands shown in Table 1 and listed above may require a dedicated RF receiving circuit.

TABLE 1

| GNSS system | Signa | Center Frequency (MHz) | Bandwidth (+/−MHz) |
|---|---|---|---|
| GPS | L1 | 1575.42 | 1.023 |
|  | L2/ L2 C | 1227.6 | 1.023 |
| GLONASS | R1 | 1602 | +3.656/−4.219 |
|  | R2 | 1246 | +3.656/−4.219 |

It is desirable to receive GNSS signals in multiple frequency bands to make the GNSS receiver more versatile and more stable in noisy or occluded environments. For example, conventional GPS receivers have included the capability to receive both L1 and L2 signals so that L2 signals can be used when L1 signals are unavailable. Such receivers have used separate analog processing circuits or have used spatial and time multiplexing to receive both the L1 and L2 signals. The use of separate circuits to receive L1 and L2 signals adds to the size, cost and weight of the receiver. The use of separate circuits also requires separate analog signal paths which adds to the pin count for components within the receiver. The use of spatial and time multiplexing can degrade the resolution associated with the reception of the signal.

GNSS receivers have been integrated in various products, such as, mobile phones, smart phones, tablets, netbooks, laptops, automobile, etc. It would be desirable to include multiple types of GNSS receivers in the products to provide navigation operations with greater versatility and stability. For example, one type of GNSS system may not be available in a particular area or a signal for a certain GNSS may be jammed, and it may be desirable to use another type of GNSS or another GNSS signal. However, the integration of more types of GNSS receivers into products adds to the size, cost and weight of the products. For example, having a separate analog signal processor for each type of GNSS adds to the size, cost and weight of the product. Further having separate analog signal paths for each GNSS and each GNSS signal adds to the pin count within the product and adds multiple analog-to-digital converters (ADCs) to the interface product.

SUMMARY

An exemplary embodiment relates to a method. The method comprises down converting at least a first signal on a first path in a first frequency band to provide a first IF signal. The method can also comprise down converting at least a second signal on second path in a second frequency band to provide a second IF signal. The second signal can include a second baseband signal. The first IF signal and the second IF signals are interspersed in the frequency domain, and the first frequency band is different from the second frequency band. The method can further comprise combining at least part of the first IF signal and the second IF signal to provide a combined signal on an output signal path for reception by a digital processing circuit.

Another exemplary embodiment relates to a circuit. The circuit comprises a down converter configured to down convert a first signal on a first path in a first frequency band to provide a first IF signal and a second signal on second path in a second frequency band to provide a second IF signal. The first IF signal and the second IF signals are interspersed in the frequency domain, and the first frequency band is different from the second frequency band. The circuit further comprises a combiner configured to combine at least part of the first IF signal and the second IF signal, and a driver configured to output the combined signal on an analog signal path. The first IF signal can be a Zero IF (ZIF), very low IF (VLIF), or Low IF (LIF) signal in certain embodiments.

Another exemplary embodiment relates to an apparatus. The apparatus comprises means for down converting two or more GNSS signals to be provide two or more down converted signals interspersed in the frequency domain and means for combining the two or more down converted signals to create a combined signal for reception by a digital signal processor. The two or more GNSS signals can be in different frequency bands.

Another exemplary embodiment relates to a non-transitory computer readable storage medium storing a computer program that when executed on a device causes the device to perform a process that includes down converting two or more GNSS signals to be interspersed in the frequency domain. The process can combine the down converted GNSS signals to create an interspersed, combined signal that includes the base band signals of the two or more GNSS signals.

DETAILED DESCRIPTION

Reference throughout this specification to "one example", "one feature", "an example" or "one feature" means that a particular feature, structure, or characteristic described in connection with the feature and/or example may be included in at least one feature and/or example of claimed subject matter. Thus, the appearances of the phrase "in one example", "in one embodiment" "an example", "in one feature" or "a feature" in various places throughout this specification are not necessarily all referring to the same feature and/or example. Furthermore, the particular features, structures, or characteristics may be combined in one or more examples and/or features. Although various examples are described below with respect to GPS signals and particular frequency bands, they are not provided in a limiting fashion, and the claims are applicable to all types of signals and receivers unless explicitly limited to particular types of receivers and signals within the claim.

In the context of the embodiments described herein, the terms "receiver" and "GNSS receiver" can designate a complete self-contained receiver device, but also a module, included in a complex device, for example a GNSS (e.g., GPS, GLONASS, etc.) module in a mobile or cellular phone, a car alarm, a PDA (Portable Digital Assistant) and so forth. The terms above may also indicate a pluggable device, which may be connected with a hosting device by means of an appropriate bus, for example a GPS PC-card.

The terms "receiver" and "GNSS receiver" should also be understood, in the context of the embodiments described herein, as including one of more integrated circuits, arranged to realize a GNSS receiver (e.g. a GPS, GLONASS, BeiDou system, or a local or regional navigation system, or other type of GNSS receiver or a complete module), as defined above.

Figure 1A:
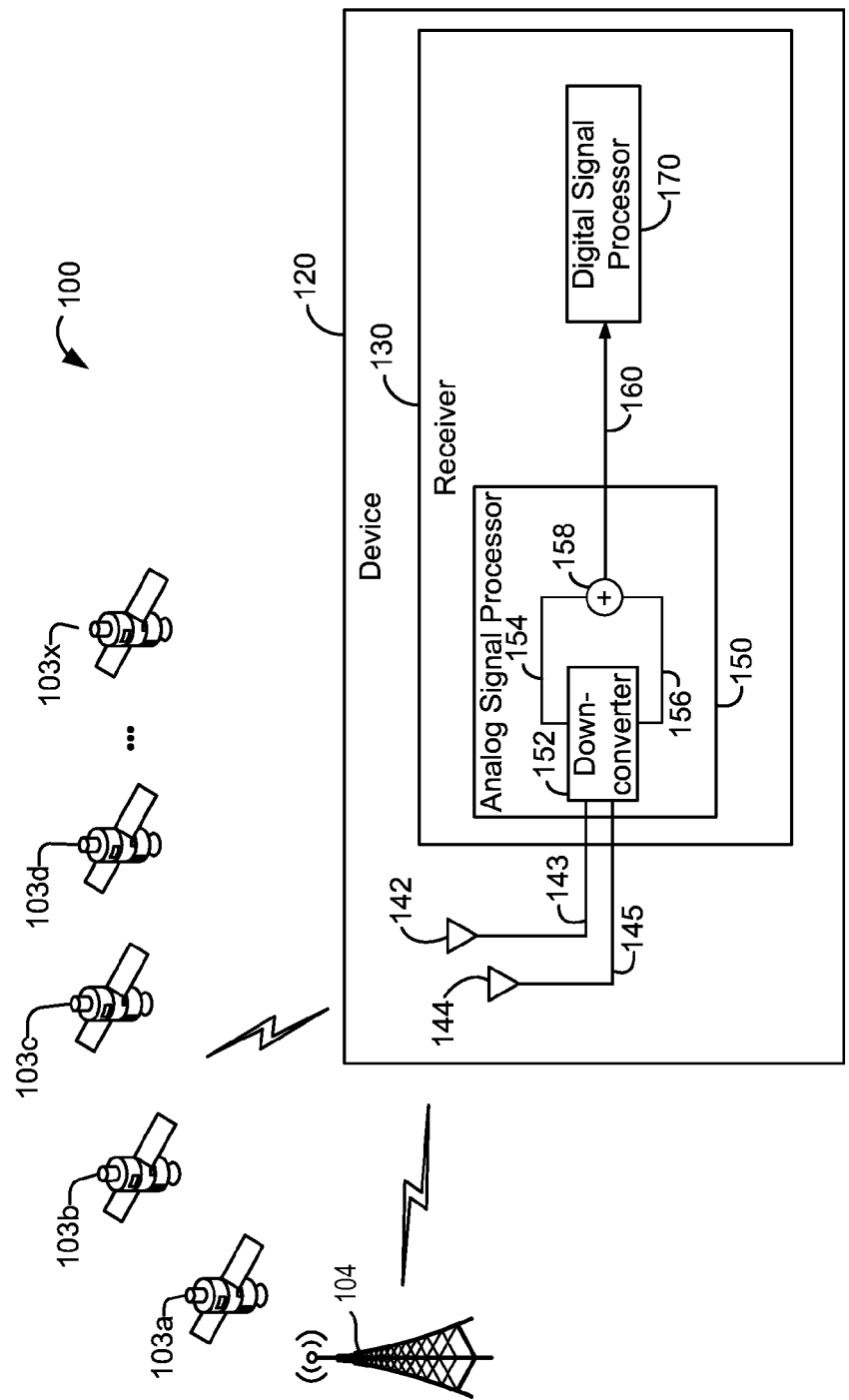
FIG. 1a is a schematic diagram of a signal receiver and its related environment according to an exemplary embodiment.

In one embodiment with reference to FIG. 1a, a communication system 100 includes a device 120 that is configured to receive signals from satellites 103a-x, a base station 104, a pseudolite, etc. Device 120 can be any type of signal processing device. According to one embodiment, device 120 is a GNSS capable device that can be integrated into a larger product or system. In some embodiments, the device 120 may be a portable device such as but not limited to a cellular phone, smart phone, tablet, laptop computer and may include various other components that are not described herein.

Device 120 includes an antenna 142, an antenna 144, and a receiver 130. Although shown as two separate antennas 142 and 144, antennas 142 and 144 can be combined as a single antenna with one or more elements. Receiver 130 includes an analog front end or analog signal processor 150, and a digital signal processor 170 in one embodiment. Analog signal processor 150 is coupled to a signal path 143 associated with antenna 142 and a signal path 145 associated with antenna 144. Analog signal processor 150 is coupled to the digital signal processor 170 via an analog signal path 160.

In one embodiment, device 120 is advantageously configured to process more than one GNSS signal from a single GNSS system and/or signals from more than one type of GNSS. In one embodiment, device 120 can process L1 and L2 signals from the GPS and R1 and R2 signals from GLONASS using the same analog front end (e.g., processor 150). Although GPS and GLONASS are mentioned, device 120 can be configured to process signals from other sources, such as, other types of GNSS including but not limited to signals associated with the BeiDou navigation system, the Galileo position system and other regional or local navigation systems.

Analog signal processor 150 includes a down-converter 152, signal path 154, signal path 156 and a combiner 158. Analog signal processor 150 is configured to receive the signals (e.g., positional signals such as but not limited to, GNSS L1/R1, L2/R2 signals and/or other signals) from the antennas 142 and 144 and perform analog signal processing to create an analog output signal at analog signal path 160 for digital signal processor 170. The digital signal processor 170 converts the analog output signal to a digital signal and processes the digital signal for navigation, targeting and/or positioning operations. In one embodiment, the analog signal processor 150 is configured to receive a plurality of different types of signals and process the signals such that there is only a single link or path 160 between the digital signal processor 170 and the analog signal processor 150. Path 160 can include multiple conductors, such as a four conductor path for differential I and Q signals associated with a modulated satellite signal, in one embodiment. Alternatively, path 160 can be a conductor pair or a single conductor. Embodiments of device 120 can advantageously be configured to stably perform navigation, targeting and/or positioning operations, while optimizing receiver 130 for lower pin count, size, and power usage.

Figure 3A:
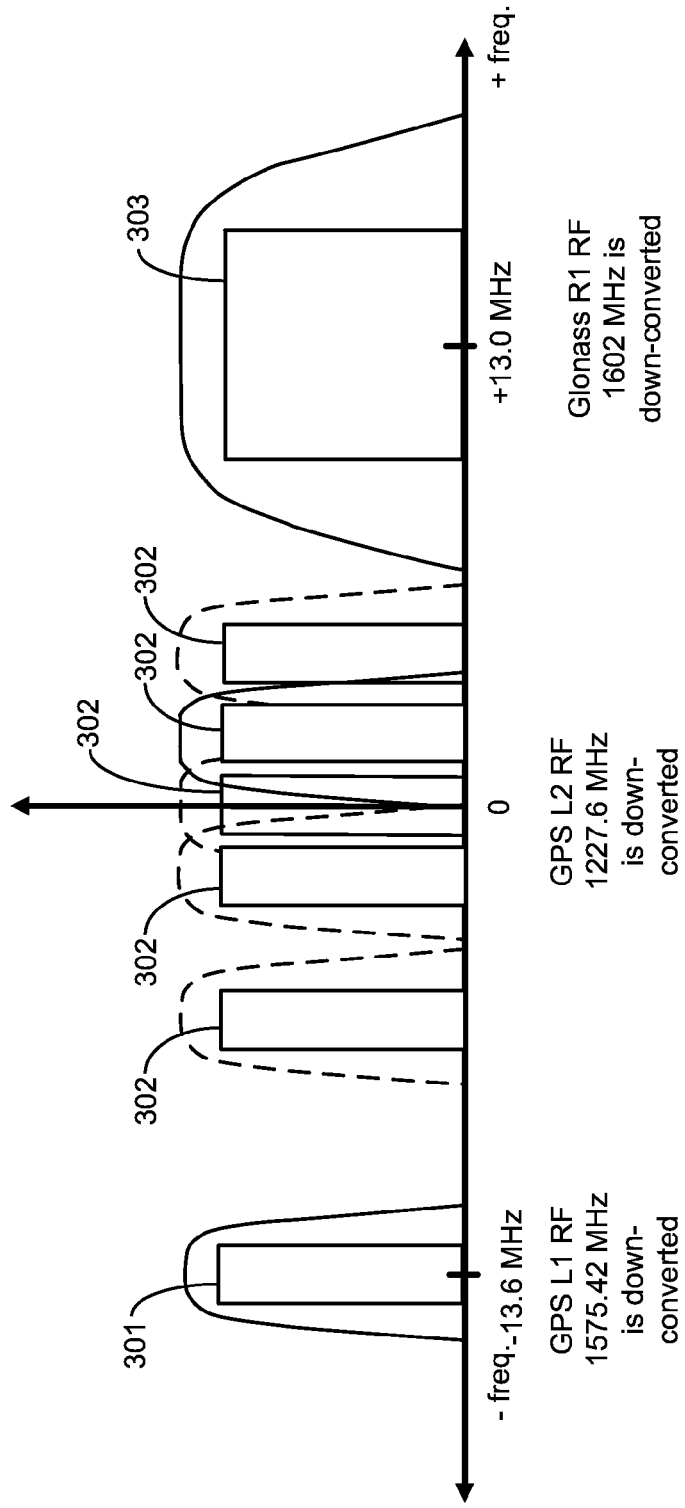
FIG. 3a shows a graph that illustrates an output signal that may be generated by the analog portion in FIGS. 1a, 2a, and 2c according to an exemplary embodiment.

Frequency down converter 152 may receive two or more signals and intersperse each signal in the frequency domain such that each signal does not overlap any other signal in one embodiment. In some example embodiments, frequency down converter 152 is configured to place the baseband signal of a first signal at Zero IF (ZIF) (e.g., 0 MHz), very low IF (VLIF)) (e.g., ±1 MHz), or Low IF (LIF) 0 MHz (ZIF) (e.g., ±3 MHz). In this embodiment, the baseband signal of the first signal may be interspersed away from the second signal. The first signal is transmitted on path 154 to a combiner 158 and the second signal is transmitted on path 156 to the combiner 158. The combiner 158 delivers the combined signal on path 160 including the baseband (BB) signals (e.g., L1/R1 and L2/R2 BB signals) to reduce the number of interface lines (and/or pins) between the analog signal processor 150 and the digital signal processor 170 in one embodiment. Combiner 158 combines the signals such that the signals remain separated in frequency domain as shown in FIG. 3a in one embodiment. Combiner 158 may combine the signals on paths 154 and 156 in the voltage domain or the current domain. Combiner 158 may output a signal on path 160 to the analog to digital converter in the digital signal processor 170. In an example embodiment, the digital signal processor 170 may be located on a different physical chip than the analog signal processor 150. Alternatively, the digital signal processor 170 is located on the same chip as the analog signal processor. The combiner 158 may be a baseband current mode combiner in one embodiment.

According to one embodiment, device 120 may be configured to determine that certain GNSS signals are being jammed, interfered with, or inadequate for navigation, targeting and/or positioning operations. In an example embodiment, the positional signals in the L1/R1 band may be jammed or have poor signal quality. In response, device 120 may determine that the L2/R2 band is needed to continue to determine the location of the device and analog signal processor 150 can provide the received signals in the L2/R2 band without multiplexing and signal degradation in one embodiment. In another embodiment, the L2/R2 band may be used in the absence of a L1/R1 jamming signal.

Signals from various other types of transmitters may jam or interfere with the GNSS signals. For example, the L1 signal can be jammed or be interfered by other signals, such as but not limited to, 2nd harmonics of signals at 788 MHz (B13/14), intermodulated signals by 1851 MHz (PCS) and 1783 MHz (AWS), intermodulated signals by 2.4 GHz (WLAN) and 825 MHz (Cell), etc. L1/R1 jamming may be avoided by simultaneous L1/L2 and/or R1/R2 reception. L2 interference avoidance may result in anti-jamming and differential GNSS (e.g., GPS) solutions. However, simultaneous L1/L2 signal reception can lead to an increase in area, power used, and pins in conventional receivers. In one embodiment, a down converter with a local oscillator (LO) configured for interspersed frequency allocation is advantageously used in analog processor 150. The signals from antennas 142 and 144 can be down converted by appropriately choosing LO frequencies such that the baseband signal for L2 signal is placed between baseband signal for the L1 and/or R1 signals in the frequency domain of an intermediate frequency signal (IF) in one embodiment.

Figure 1B:
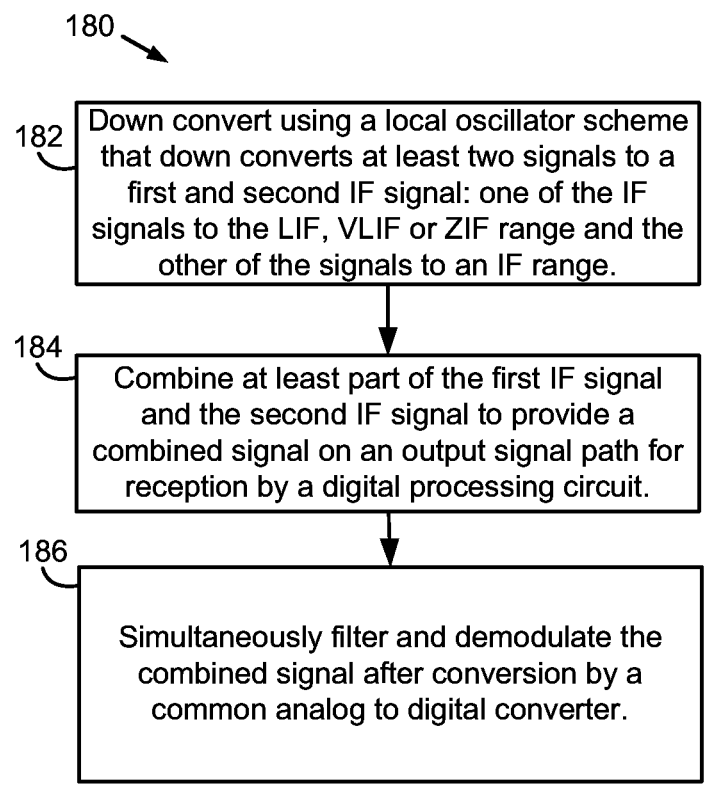
FIG. 1b is a flowchart of method steps for receiving and processing a signal according to an exemplary embodiment.

With reference of FIG. 1b, a flow chart of a method 180 for processing signals is shown according to an example embodiment. In one embodiment, the signals may be GNSS positional signals that include one or more GPS signals although any type of signal can be utilized in method 180. Method 180 includes step 182 that can be implemented in analog processor 150. In one embodiment, step 182 can be implemented by down converter 205 (FIG. 2a), mixers 243 and 244 (FIG. 2b), or mixers 283 and 284 (FIG. 2c). In step 182, the down converter uses a local oscillator mixing scheme to down convert one of the two signals to a LIF, VLIF or ZIF signal and the other of the two signals to an IF signal in one embodiment. The local oscillator frequencies are chosen to appropriately down convert the signals to the appropriate frequency band. At a step 184, the analog signal processor combines at least part of the first IF signal and the second IF signal to provide a combined signal on an output signal path for reception by a digital signal processor in one embodiment. At step 186, the digital signal processor may simultaneously filter and demodulate the signal after a common analog to digital converter (ADC) receives the combined IF signal in one embodiment. The combined signal can be provided to the ADC by a common driver or amplifier operating in a current mode in one embodiment. In another embodiment, the driver can operate in a voltage mode.

Figure 2A:
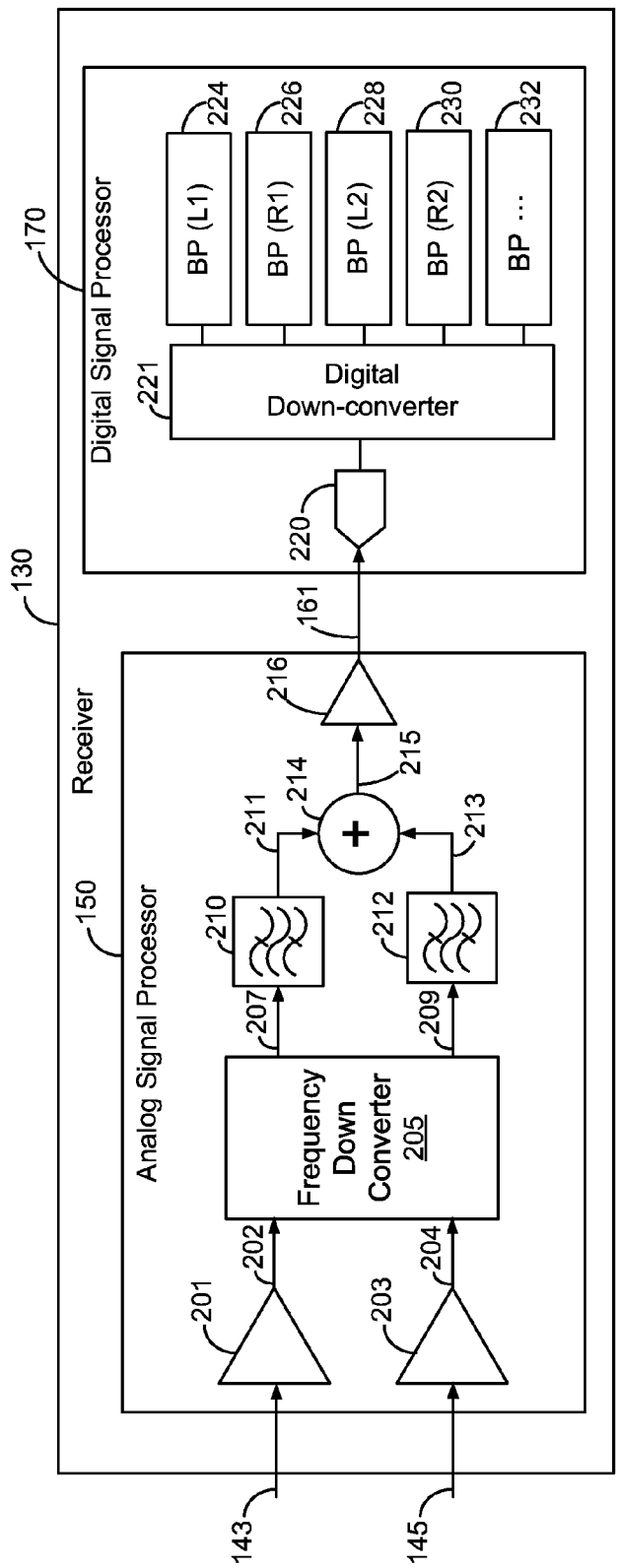
FIG. 2a is a schematic circuit diagram of the analog portion and the digital portion of the signal receiver illustrated in FIG. 1a according to an exemplary embodiment.

With reference to FIG. 2a, receiver 130 includes analog signal processor 150, an analog signal path 161 and a digital signal processor 170. Receiver 130 is configured to process signals from one or more GNSS systems. In some embodiments, the receiver 130 is configured to process GPS L1/L2 bands and GLONASS R1/R2 bands (e.g., two or more or four or more different bandwidths of analog signals).

After processing the signals of different bandwidths, analog signal processor 150 can generate a single signal on the analog signal path 161 that is delivered to the digital signal processor 170. The analog signal path 161 can have a single conductor or a pair of conductors for a differential signal in one embodiment. The analog signal processor 150 includes one or more front end circuits 201, 203, a frequency downconverter 205, two or more filters 210 and 212 (e.g., baseband or IF filters), a combiner 214 and an output driver 216 (e.g., baseband or IF output driver). The digital signal processor 170 includes a single analog to digital converter 220 which generates a single digital signal that is down-converted by a digital down-converter 221. The baseband processors 224, 226, 228, 230 and 232 are configured to extract the signal with the appropriate type of original bandwidth from the output that is generated by the digital down-converter 221. In some embodiments, the baseband processors 224, 226, 228, 230 and 232 are configured to extract digital signals that originally belonged to four or more different analog bands. Fewer or more baseband processors can be utilized depending upon system criteria and design specifications.

In one embodiment, two signals are received at paths 143 and 145 by front end circuits 201 and 203. In one embodiment, the signals on paths 143 and 145 can be received from the antennas 142 and 144 simultaneously. Front end circuits 201 and 203 can amplify the simultaneously received signals (e.g., RF signals such as L1/R1 and L2/R2 signals) in one embodiment. In some embodiments, front end circuits 201 and 203 can include prefilters (e.g., before frequency downconversion filters), a low noise amplifier (LNA) and a gain circuit. The prefilters can be centered towards the L1/R1 and L2/R2 bands. In other embodiments, the RF front end circuits 201 and 203 may be located with the antennas 142 and 144.

Down converter 205 uses two different local oscillators or uses the same local oscillator with the down conversion frequency being modified to down convert the signals from circuits 201 and 203. The signals are down converted to base band or intermediate frequency (IF), and provided on paths 207 and 209 in one embodiment. One of the signals on paths 207 and 209 is down converted to be a zero IF (ZIF), a very low IF (VLIF) or low IF (LIF) signal while the other signal is down converted to a frequency range between −25 MHz and +24 MHz and outside of the ZIF, VLIF and LIF ranges in one embodiment. Alternative frequency ranges include −20.6 MHz to +16 MHz, −18.6 MHz to +14 MHz, −14.6 MHz to +12 MHz, etc. In one embodiment, the down converter 205 is configured to intersperse a down converted L2 frequency between the down converted L1 and R1 frequency spectrum using one of a ZIF, VLIF, or LIF spectrum. The circuits shown in FIGS. 1, 2a and 2c generate an analog signal having both positive and negative frequencies in one embodiment. The circuit shown in FIG. 2b generates an analog signal having positive frequencies. The circuit shown in FIG. 2b fails to generate signals with negative frequencies as discussed with reference to FIG. 3d in one embodiment.

Frequency down converter 205 may receive two or more GNSS signals and intersperse each signal in the frequency domain such that each signal does not overlap any other signal in one embodiment. In some example embodiments, frequency down converter 205 is configured to place the baseband signal of the L2 signal (L2 BB Signal) at 0 MHz (ZIF), ±1 MHz (VLIF), or ±3 MHz (LIF). In this embodiment, the baseband signal of the L1 signal (L1 BB signal) may be interspersed away from the L2 BB signal.

Paths 207 and 209 can each be a two wire path for I and Q components of the down converted signal or a four wire differential path for the I and Q components of the down converted signal in one embodiment. After down converting, the down converted signals are filtered on paths 207 and 209 by filters 210 and 212, respectively, and combined by combiner 214 in one embodiment. Filter 210 and 212 can be low pass, band pass, or high pass filters to pass ZIF, VLIF or LIF signals selectively in one embodiment. In one embodiment, one of filters 210 and 212 is a baseband or ZIF, VLIF or LIF filter, and the other of filters 210 and 212 is a filter having a range between LIF and IF. Combiner 214 can be a current mode baseband filter or a voltage mode combiner.

In one embodiment, filter 210 filters out high frequency jammers and harmonics from the L2 and/or R2 signals received from frequency down converter 205. In one embodiment, filter 212 filters out high frequency jammers and harmonics from the L1 and/or R1 signals received from the frequency down converter 205.

The signals on paths 211 and 213 are combined by combiner 214 and the resulting signal is provided across path 215 to output driver 216. Driver 216 provides the combined signal to path 161 for reception by the digital signal processor 170. Analog to digital converter 220 coverts the analog signal on path 161 to a digital signal for processing by baseband processors 224, 226, 228, 230 and 232.

In the embodiment, the L1 BB signal can be located at −13.6 MHz from 0 MHz. In another embodiment, the downconverter 205 may locate the L1 BB signal at 0 MHz and the L2 BB signal at −13.6 MHz. In other embodiments, interspersed may mean that after the two or more signals are down converted, each signal does not overlap the bandwidth of any other signal. In some embodiments, interspersed signals are non-overlapping each other in the frequency domain. The down converter 205 may include one or more local oscillators that are each configured to generate a signal with a matching frequency to reduce the frequency of the original RF signal. For example, to down-convert L2 BB signal from 1227.6 MHz down to a VLIF +1 MHz signal, the local oscillator in down-converter 205 is configured to generate a signal having a frequency of 1226.6 MHz such that only a +1 MHz signal remains, in one embodiment. As mentioned above, the circuits shown in FIGS. 1a, 2a and 2c generate an analog signal having both positive and negative frequencies. The circuit shown in FIG. 2b generates an analog signal having positive frequencies in one embodiment. The circuit shown in FIG. 2b fails to generate signals with negative frequencies as illustrated by FIG. 3d in one embodiment.

Combiner 214 delivers the combined signal on path 215 including the BB signals (e.g., L1/R1 and L2/R2 BB signals) to reduce the number of interface lines (and/or pins) between the analog signal processor 150 and the digital signal processor 170 in one embodiment. Combiner 214 combines the signals such that they remain separated in frequency domain as shown in FIG. 3a in one embodiment. Combiner 214 may combine the signals 211 and 213 in the voltage domain or the current domain. Combiner 214 may output a signal on path 215 to the output driver 216 which outputs the analog signals to the analog to digital converter inputs of converter 220 via path 161. In an example embodiment, the digital signal processor 170 may be located on a different physical chip than the analog signal processor 150. The combiner 214 may be a baseband current mode combiner in one embodiment.

In one embodiment, the analog output path 161 delivers both the L1/R1 and L2/R2 BB signals. In some embodiments, the analog path 161 provides a quadrature (I and Q) BB signal. In other embodiments, path 161 may be a bus that includes a plurality of physical connections that deliver the signal in parallel. In another embodiment, path 161 can be a single wire or differential path that connects the analog to digital converter 220 in digital signal processor 170 and the output driver 216 in the analog signal processor 150. The L1/R1 and L2/R2 BB signals are not spatially or time multiplexed when the signals are received in one embodiment.

The digital signal processor 170 includes various components including an analog to digital converter (ADC) 220, baseband processors 224, 226, 228, 230 and others processors 232. As mentioned above, the digital signal processor 170 may be located on a different chip than the analog signal processor 150. The analog to digital converter (ADC) 220 may be a GNSS analog to digital converter configured to handle all positional signals that comprise GNSS. In other embodiments, the ADC 220 is not a subsampling converter, instead, the ADC 220 is Nyquist or oversampling rate converter. In one embodiment, the digital signal processor 170 has a single, differential or quadrature input lines that receive the analog signal and the received signal is provided as input to a single path ADC 220. After converting the analog signal to a digital signal, the baseband processors BP (L1) 224 may match filter the digital data corresponding to the L1 BB band. After converting the analog signal to a digital signal, the baseband processors BP (R1) 226 may match filter the digital data corresponding to the R1 BB band. After converting the analog signal to a digital signal, the baseband processors BP (L2) 228 may match filter the digital data corresponding to the L2 BB band. Other baseband processors 232 can match filter other GNSS bands. Processor 170 can perform additional operations on the signal or signals received on path 161 without departing from the scope of the invention.

Processor 170 may be integrated with analog signal processor 150 and the processor 170 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof. Processor 150 and/or 170 can include any type of memory that may be enabled to store information in the form of data and/or instructions for performing the processes described herein. By way of example but not limitation, the memory may be included in an article of manufacture and may include a non-transitory form of memory, one or more optical data storage discs, one or more magnetic storage disks or tapes, etc.

Accordingly, the circuit in FIG. 2a achieves various advantages including integrating more than one type of GNSS receiver into products without increasing size, cost and weight of the products in one embodiment. For example, the circuit in FIG. 2a has a single analog signal processor 150 for all types of GNSSs and thus does not add to the size, cost and weight of the product by requiring multiple analog processors in one embodiment. Further the circuit in FIG. 2a has a single analog signal path 161 for all desired GNSSs to reduce the pin count within the product and uses a single analog-to-digital converter 220 (ADC) to the interface product in one embodiment.

Figure 2B:
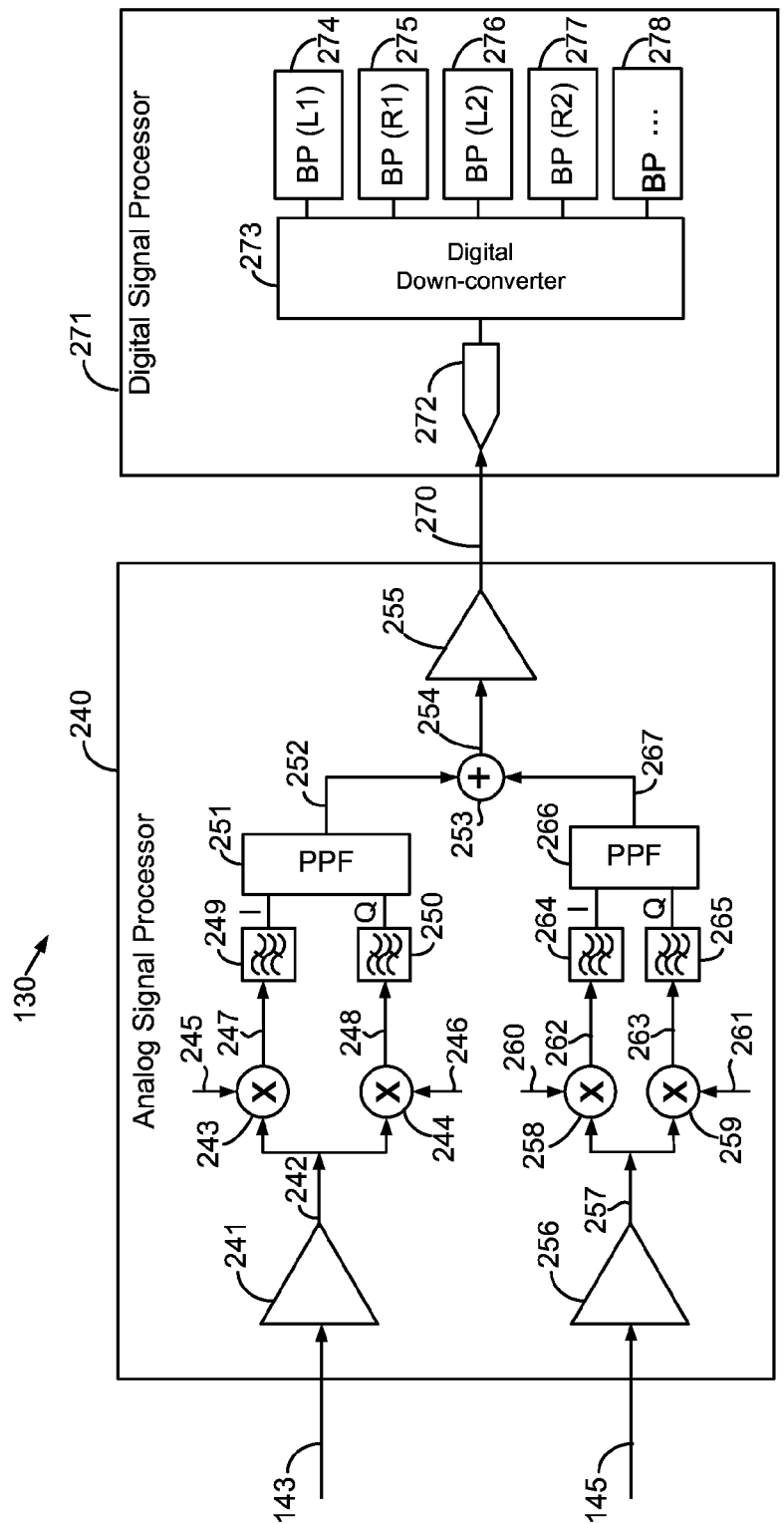
FIG. 2b is a schematic circuit diagram of the analog portion and the digital portion of the signal receiver illustrated in FIG. 1a according to another embodiment.
Figure 2C:
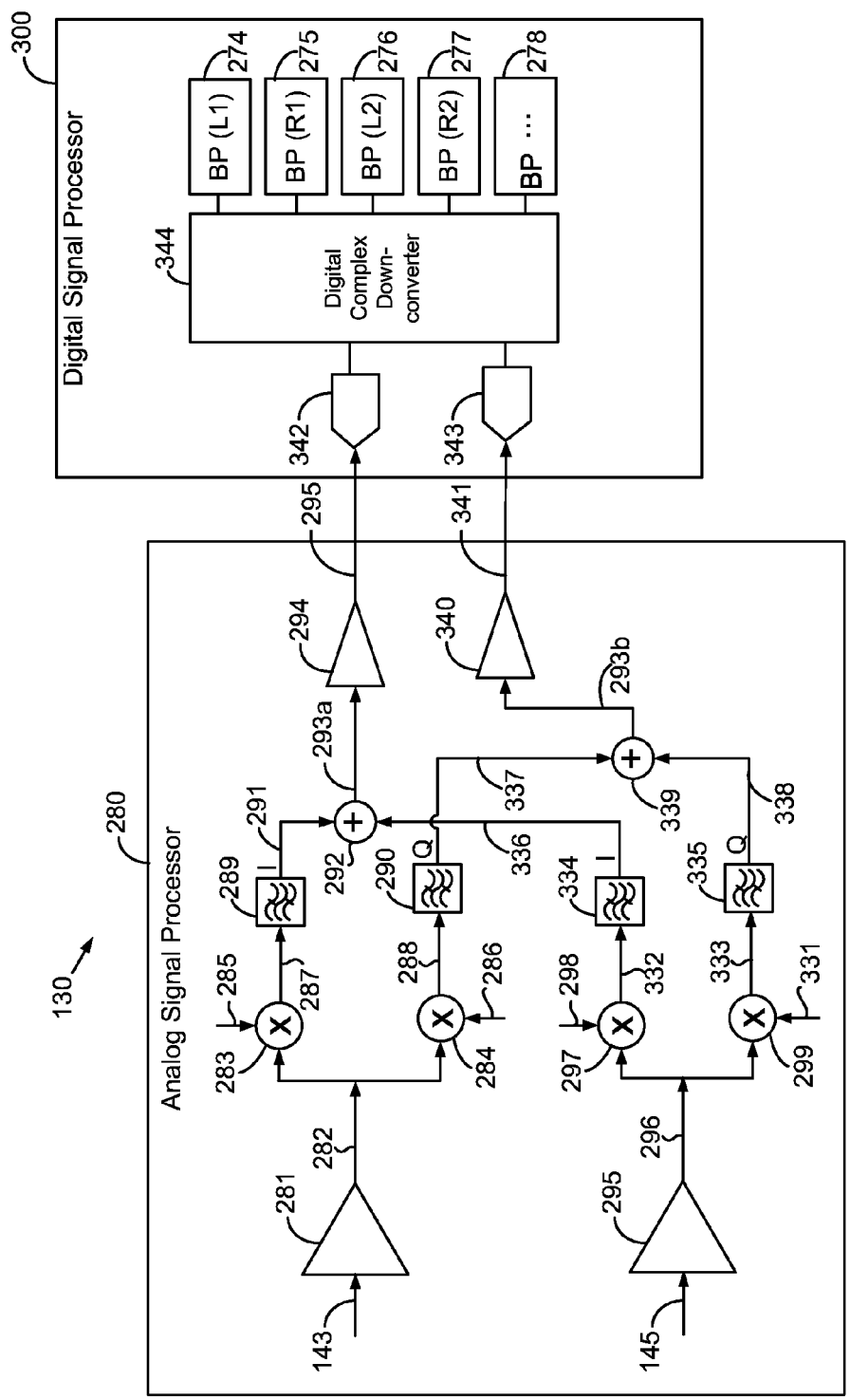
FIG. 2c is a schematic circuit diagram of the analog portion and the digital portion of the signal receiver illustrated in FIG. 1a according to yet another embodiment.

FIG. 2b illustrates an analog signal processor 240 and a digital signal processor 271 for receiver 130 according to another embodiment. The analog signal processor 240 and the digital signal processor 271 are similar to the analog signal processor 150 and the digital signal processor 170 discussed above. The analog signal processor 240 includes circuits that are configured to receive one or more signals. For example, signals on paths 143 and 145 from antennas 142 and 144 (FIG. 1a) are shown as being received initially by the analog signal processor 240 in one embodiment. Although two signals are shown in FIG. 2b, the analog signal processor 240 may receive more signals in one embodiment. In another embodiment, one signal line may be able to provide the one or more signals to the analog signal processor 240. The signals on paths 143 and 145 that are received from the antennas 142 and 144 are initially received by an RF front end circuit 241 and an RF front end circuit 256, respectively, in one embodiment. The RF front end circuits 241 and 256 may operate in a similar manner as RF front end circuits 201 and 203, described above.

In one embodiment, the RF front end circuits 241 and 256 may amplify the simultaneously received and continuously quantized RF signals. In some embodiments, RF front end circuits 241 and 256 may include a low noise amplifier (LNA) and a gain block. In other embodiments, the RF front end circuits 241 and 256 may be located with the antennas 142 and 144. In some embodiments, RF front end circuits 241 and 256 include preselector filters that are centered towards a positional signal, telecommunication signal or another type of signal desired to be received. For example, the preselector filters in circuit 241 can have frequencies that are centered towards positional signals, such as but not limited to, the L2 band and/or the R2 band, and the preselector filters in circuit 256 can have frequencies that are centered towards positional signals, such as but not limited to, L1 band and/or the R1 bands.

The resulting signals from the RF front end circuits 241 and 256 may be split into in-phase (I) signals at paths 247 and 262 by using mixers 243 and 258 and quadrature-phase (Q) signals at paths 248 and 263 by using mixers 244 and 259. In one embodiment, dividing the signal into its I and Q components allows processing of the signal at negative frequency.

The frequency of the BB signal provided by mixer 243 may be controlled by a local oscillator signal at an input 245. The frequency of the BB signal provided by mixer 244 may be controlled by a local oscillator signal at an input 246. In one embodiment, the mixer 243 multiplies the RF signal by the in-phase LO and delivers the resulting in-phase signal to the filter 249. In one embodiment, the mixer 244 multiplies the RF signal by the quadrature LO and delivers the resulting quadrature signal to the filter 250. In one embodiment, the mixers 243 and 244 are configured to down convert the received signals to a frequency that is different than the frequency associated with mixers 258 and 259. In other embodiments, the mixers 243 and 244 are configured to down convert to a frequency based on determining the frequency of the signals provided by mixers 258 and 259 and choosing a different frequency.

The filter 249 (e.g., IF or baseband filter) filters out high frequency jamming signals and other signals that may be the harmonics of the desired signal from the in-phase L2 and/or R2 signals received from the mixer 243. The filter 250 (e.g., baseband or IF filter) filters out high frequency jamming signals and other signals that may be the harmonics of the desired signal from the quadrature L2 and/or R2 signals received from the mixer 244 in one embodiment. After filtering the signal, the signal is delivered to a polyphase filter 251 that combines the I and Q components to form a signal on path 252. In one embodiment, the signal on path 252 is delivered to or received by a combiner 253. The combiner 253 performs similar function as the combiner 214 discussed with reference to FIG. 2a.

In one embodiment, the front end circuit 256 receives a signal on path 145. In one embodiment, the front end circuit 256 processes the signal 145 in a similar manner as front end circuit 241 to generate a signal on path 257. Mixers 258 and 259 process the signal in a similar manner as mixers 243 and 244, respectively. Mixers 258 and 259 may receive local oscillator signals at respective inputs 260 and 261 and perform down conversion of the signal and separate the signal into their I and Q components. The Mixers 258 and 259 may down convert the signal to a frequency that is different than the frequency associated with mixers 243 and 244. After down converting and separating the signal on path 257, the signals on paths 262 and 263 are delivered to filters 264 and 265, respectively. Filters 264 and 265 (e.g., IF or baseband filters) perform similar functions as filters 249 and 250. Signals from filters 264 and 265 are transmitted to polyphase filter 266. Polyphase filter 266 performs similar functions as discussed above with respect to polyphase filter 251. Polyphase filter 266 generates a signal on path 267 that is provided to the combiner 253.

After receiving signals on paths 252 and 267, the combiner 253 performs current combination of two signals in a similar process as combiner 214 described above according to one embodiment. The combiner 253 combines the two signals which are interspersed and do not overlap in the frequency domain according to one embodiment. The signal on path 254 may be delivered to the output driver 255 which can generate a single signal path that combines both BB signals associated with paths 143 and 145.

The analog signal path 270 delivers both the BB signals associated with paths 143 and 145 (e.g., L1/R1 and L2/R2 BB signals) on a single analog output path 270. In certain embodiments, the path 270 can be single wire, a differential wire pair, or a bus that includes a plurality of physical connections that deliver the signals in parallel. In one embodiment, path 270 can be a single wire that connects the analog to digital converter 272 in the digital signal processor 271 and the output driver 255 from the analog signal processor 240. In an example embodiment, the L1/R1 and L2/R2 BB signals on paths 143, and 145 are not spatially or time multiplexed in processor 240 after the signals are received. After receiving the signal on path 270, the analog to digital converter 272 may convert the analog signal to a digital signal and deliver the digital signal to a digital down converter 273. Digital down converter 273 can further down convert the signal from analog-to-digital converter 272 in one embodiment. Digital down converter 273 allows the frequency band of interest to be moved down the spectrum so sample rates, filter requirements and digital processing loads are reduced.

Accordingly, the circuit in FIG. 2b achieves various advantages including integrating more than one type of GNSS receiver into products without increasing size, cost and weight of the products in one embodiment. For example, the circuit in FIG. 2b has a single analog signal processor 240 for all types of GNSSs and thus does not add to the size, cost and weight of the product in one embodiment. Further the circuit in FIG. 2b has a single analog signal path 270 for all desired GNSSs to reduce the pin count within the product and uses a single analog-to-digital converter (ADC) 272 in one embodiment.

FIG. 2c illustrates an analog signal processor 280 and a digital signal processor 300. The analog signal processor 280 includes front end circuits 281, 295, mixers 283, 284, 297, and 299, baseband filters 289, 290, 334, and 335, combiners 292, 339 and analog output drivers 294 and 340. The digital signal processor 300 includes two or more I, Q analog to digital converters 342 and 343, a digital complex down converter 344 and baseband processors 274, 275, 276, 277 and 278.

As discussed above with respect to FIGS. 2a and 2b, the front end circuits 281 and 295 process a signal in a similar manner as front end circuits 201 and 203, respectively. Additionally or alternatively, the front end circuits 281 and 295 process a signal in a similar manner as front end circuits 241 and 256, respectively. Mixers 283 and 284 process a signal in a similar manner as mixers 243 and 244 discussed with reference to FIG. 2b. Mixers 297 and 299 process the signal in a similar manner as Mixers 258 and 259 as discussed with reference to FIG. 2b.

Filters 289 and 290 (e.g., baseband or IF filters) receive signals 287 and 288 and process them in a similar manner as filters 249 and 250. Filters 334 and 335 receive signals 332 and 333 and process them in a similar manner as filters 264 and 265.

In FIG. 2c, instead of combining the I & Q signals as discussed with reference in FIG. 2b, the analog signal processor 280 includes two or more combiners (e.g., combiners 292 and 339) that combine the I component of the two or more different signals and combine the Q components of the two or more received signals. The combiners 292 and 339 can provide signals on paths 293a and 293b to the analog output drivers 294 and 340. In an example embodiment, the output driver 294 may deliver the combined I components from two different signals on paths 143 and 145 to the digital signal processor 300. In an example embodiment, the output driver 340 may transmit the combined Q components from two different signals on paths 143 and 145 to the digital signal processor 300.

The digital signal processor 300 may include analog to digital converters 342 and 343, digital complex down converter 344, and baseband processors 274, 275, 276, 277, and 278. The complex down converter 344 receives an I component and a Q component and provides signals for the baseband processor 274, 275, 276 and 278. In one embodiment, the converter 344 receives an IF signal from in-phase ADC 342 and quadrature phase ADC 343 and provides a baseband complex signal centered at zero frequency for baseband processors 274, 275, 276, 277, and 278. Unlike the digital down converters 221 and 273, the digital complex down converter 344 receives two signals such as, the in-phase and quadrature signal and outputs baseband complex signal centered at zero frequency.

Accordingly, the circuit in FIG. 2c achieves various advantages including integrating more than one type of GNSS receiver into products without increasing size, cost and weight of the products in one embodiment. For example, the circuit in FIG. 2b has a single analog signal processor 280 for all types of GNSS and thus does not add to the size, cost and weight of the product in one embodiment. Further, the circuit in FIG. 2c has a two analog signal paths 295 and 341 (one for in-phase signals and one for quadrature signals) to reduce the pin count within the product and uses two analog-to-digital converters (ADCs) 342 and 343 (one for in-phase signals and one for quadrature signals).

FIG. 3a shows a graph that illustrates the analog baseband output in the frequency spectrum. FIG. 3a illustrates the combined signal at the analog output path 160 (FIG. 1a) in one embodiment. As shown in FIG. 3a, a ZIF, LIF or VLIF signal 302 containing the L2 BB signal is placed (intersperseley) between the IF signal 301 containing the L1 BB signal centered at −13.6 MHz and the IF signal 303 containing the R1 BB signal centered at +12 MHz in one embodiment. The signal 302 can be interspersed in different location depending on ZIF, VLIF or LIF placement. With the placement shown in FIG. 3a, the receiver 130 can continue to receive the L2 signal even when the L1 signal is jammed or unavailable.

In other embodiments, the location or placement of signal 301, signal 302, and signal 303 in the frequency domain can be switched or interchanged. For example, the signal containing the L1 BB signal can be down converted to 0 MHz, the signal containing the L2 BB signal can be down converted to −13.6 MHz, and the signal containing the R1 BB signal can be down converted to +12 MHz, in one embodiment. In another embodiment, the signal containing the L1 BB signal is down converted to 12 MHz, the signal containing the L2 BB signal is down converted to −13.6 MHz, and the signal containing the R1 BB signal is down converted to 0 MHz. In another embodiment, the signal containing the L1 BB signal is down converted to −13.6 MHz, the signal containing the L2 BB signal is down converted to +13 MHz, and the signal containing the R1 BB signal is down converted to 0 MHz. Accordingly, various permutations (e.g. P (4,3) equaling 24 total placements in case of one of ZIF, LIF, and VLIF) are possible. Further, locations other than 12.0 MHz and −13.6 MHz can be utilized.

Other GNSS signals may be added or substituted for the signal 301, the signal 302 and the signal 303. In other embodiments, one or more of the GNSS signals is not used, for example, the signal containing the R1 BB signal may be filtered out and the signal containing the L2 BB signal and the signal containing the L1 are down converted. In one example, the signal containing L2 BB signal may be down converted to 0 MHz and the signal containing the L1 BB signal may be down converted to −13.6 MHz. In another example, the signal containing the L1 BB may be down converted to 0 MHz and the signal containing the L2 BB signal may be down converted to −13.6 MHz. In yet another embodiment, the signal containing the L1 BB signal may be down converted to 0 MHz and the signal containing the L2 BB signal may be down converted to 13 MHz. In yet another embodiment, the signal containing the L2 BB signal may be down converted to 0 MHz and the signal containing the L1 BB signal may be down converted to 13 MHz.

Figure 3B:
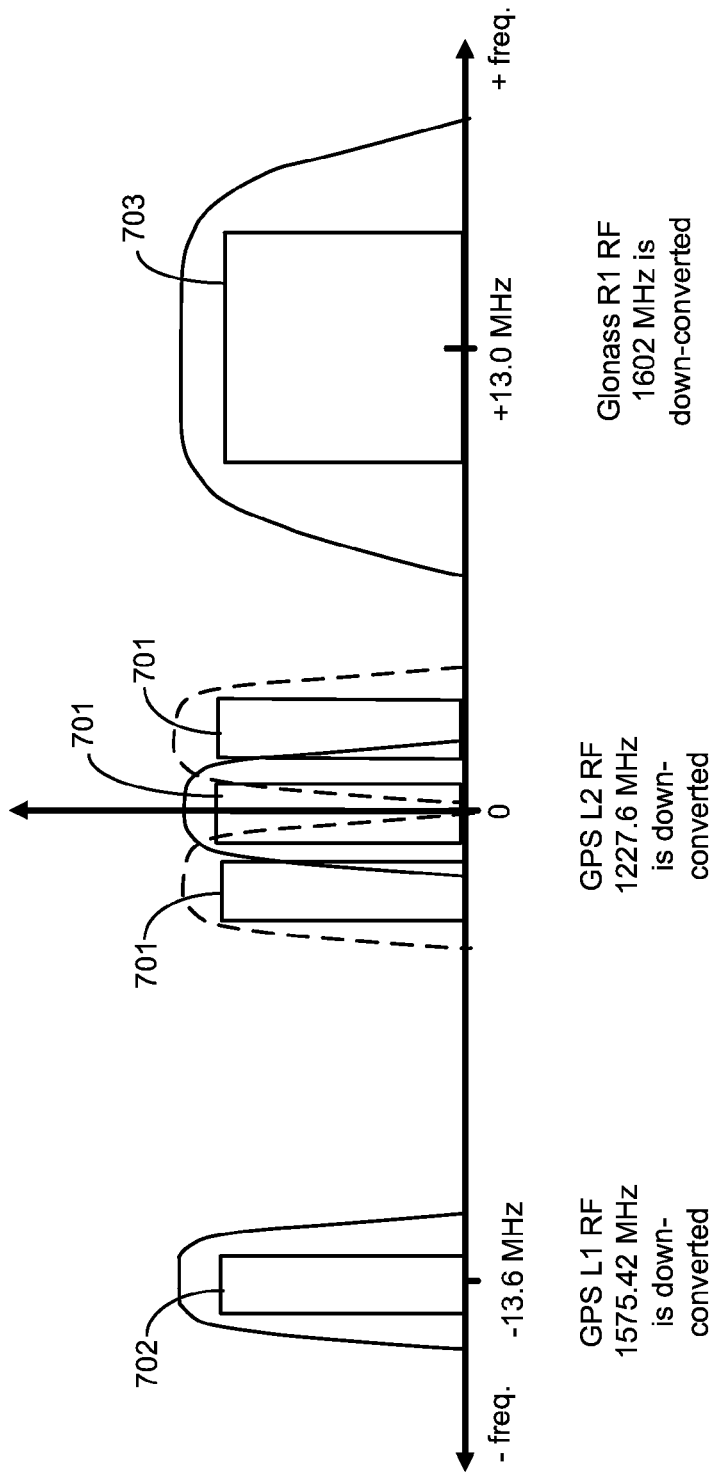
FIG. 3b shows a graph that illustrates an output signal that may be generated by the analog portion in FIGS. 1a, 2a, and 2c according to another embodiment.

FIG. 3b illustrates the combined signal at the analog output path 160 (FIG. 1a) in one embodiment. As shown in FIG. 3b, a ZIF signal 701 containing the L2 BB signal is down converted to be between an IF signal 302 containing the L1 BB signal at −13.6 MHz and an IF signal 703 containing the R1 BB signal at +13 MHz in one embodiment. The signal 701 can be interspersed in different locations depending on ZIF, VLIF or LIF placement.

Figure 3C:
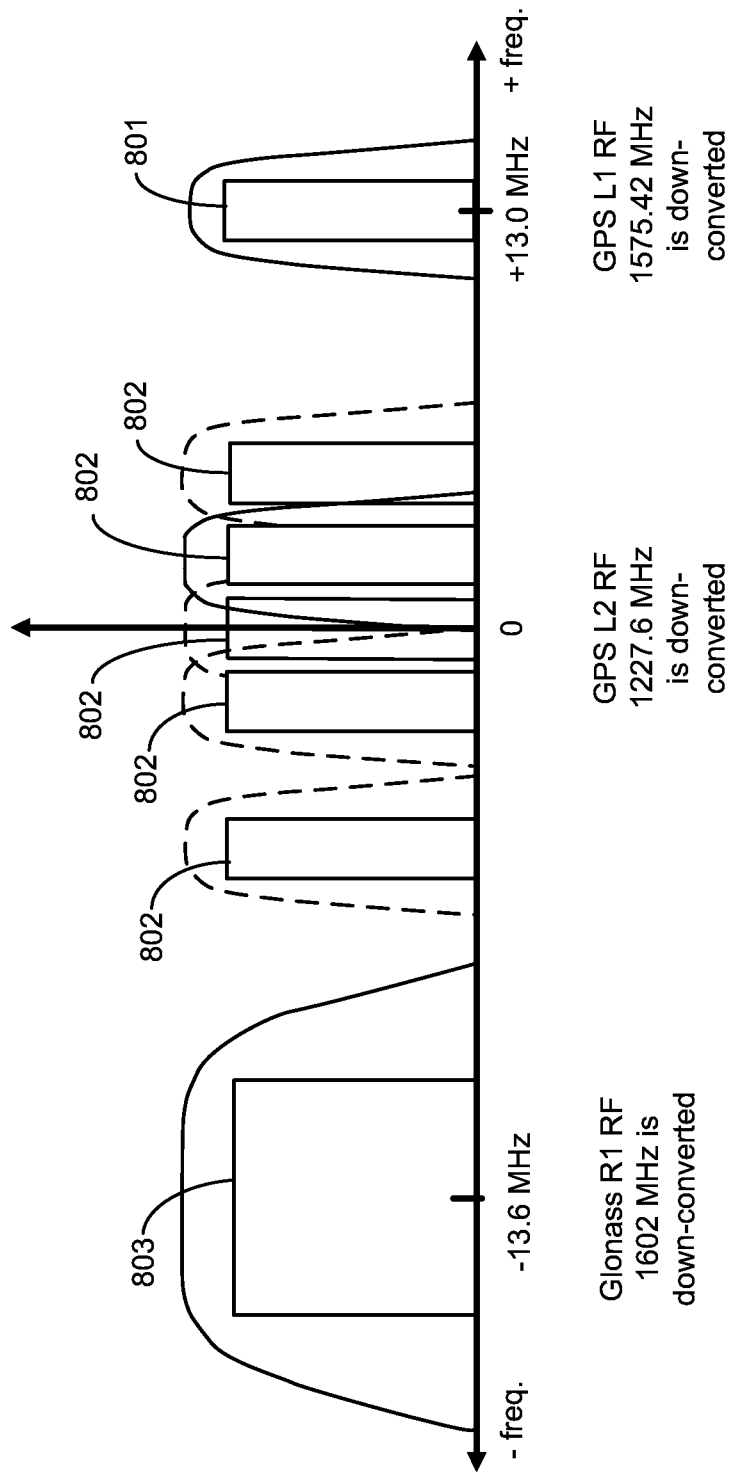
FIG. 3c shows a graph that illustrates an output signal that may be generated by the analog portion in FIGS. 1a, 2a, and 2c according to another embodiment.
Figure 3D:
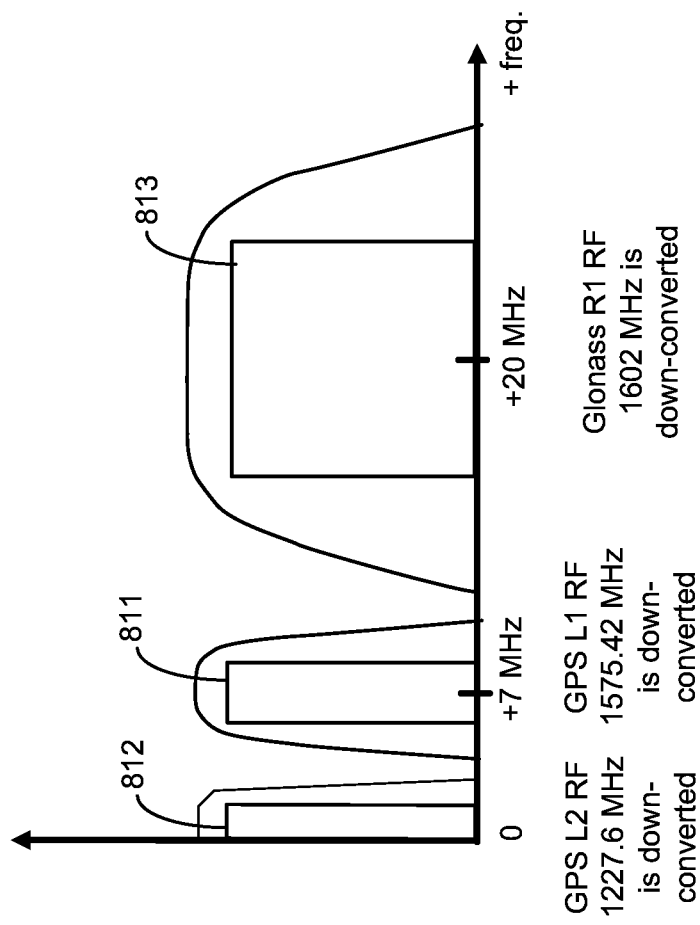
FIG. 3d shows a graph that illustrates an output signal that may be generated by the analog portion in FIGS. 1a and 2b according to another embodiment.

FIG. 3c shows an embodiment that illustrates the location of an IF signal 803 containing the GLONASS R1 BB signal and IF signal 801 containing the L1 BB signal. In this embodiment, the signal 803 is located at −13.6 MHz, the signal 801 is located at +13 MHz, and a signal 802 containing the L2 BB signal is a ZIF, VLIF, or LIF signal.

FIG. 3d shows an embodiment that illustrates the location of an IF signal 813 containing the GLONASS R1 BB signal and IF signal 811 containing the L1 BB signal 801. In this embodiment, the signal 813 is located at +20 MHz, the signal 811 is located at +7 Mhz, and a signal 812 containing the L2 BB signal is a ZIF, VLIF, or LIF signal. Receiver 130 shown in FIG. 2b generates the signals shown in FIG. 3d in one embodiment. As mentioned above, the receiver 130 in FIG. 2b generates signals with positive frequency bands in one embodiment.

Although three signals are shown in FIGS. 3a-3d, a greater number of signals may be used. Each signal that is received may be interspersed in the frequency domain. In one embodiment, the down converters and local oscillators are configured with regard to the frequencies of all other signals such that when the signals are combined the signal do not overlap.

Figure 4:
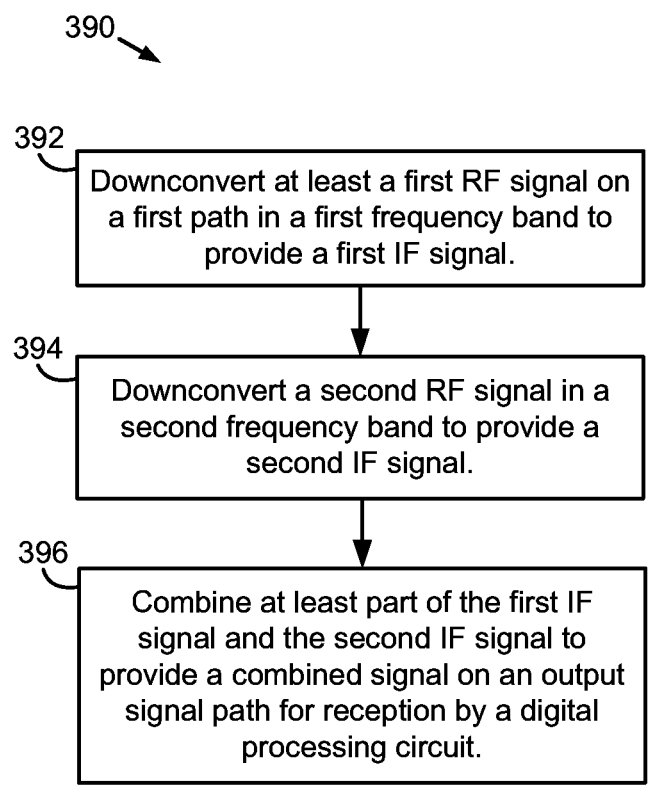
FIG. 4 is a flow chart of method steps for receiving a signal according to an exemplary embodiment.

FIG. 4 is a flow chart of a method 390 for processing signals such as GNSS positional signals, according to an example embodiment. In one embodiment, the GNSS positional signals include one or more GPS signals. Method 390 includes step 392 that can be implemented in analog processor 150. In one embodiment, step 392 can be implemented by down converter 205 (FIG. 2a), mixers 243 and 244 (FIG. 2b), or mixers 283 and 284 (FIG. 2c). In step 392, at least a first RF signal on a first RF path (e.g., path 143) in a first frequency band is down converted to provide a first IF signal. At a step 394, a second RF signal on a second path (e.g., path 145) in a second frequency band is down converted to provide a second IF signal. The two RF signal can be down converted in analog processor 150 in step 394. In one embodiment, step 394 can be implemented by converter 205 (FIG. 2a), mixers 258 and 259 (FIG. 2b) or mixers 297 and 299 (FIG. 2c). The first frequency band may be different from the second frequency band. The down conversion in steps 392 and 394 is performed to intersperse the first IF signal and the second IF signal in the frequency domain in one embodiment. The down conversion in steps 392 and 394 is performed simultaneously in one embodiment. One of the first IF signal or the second IF signal can be ZIF, VLIF, or LIF signal in one embodiment.

At step 346, the combiners 214, 253, 292, 339 (FIGS. 2a-c) may combine at least part of the first IF signal and second IF signal to provide a combined signal on an output signal path (e.g. path 160) for reception by a digital processing circuit (e.g., processors 170, 271, 300).

Figure 5:
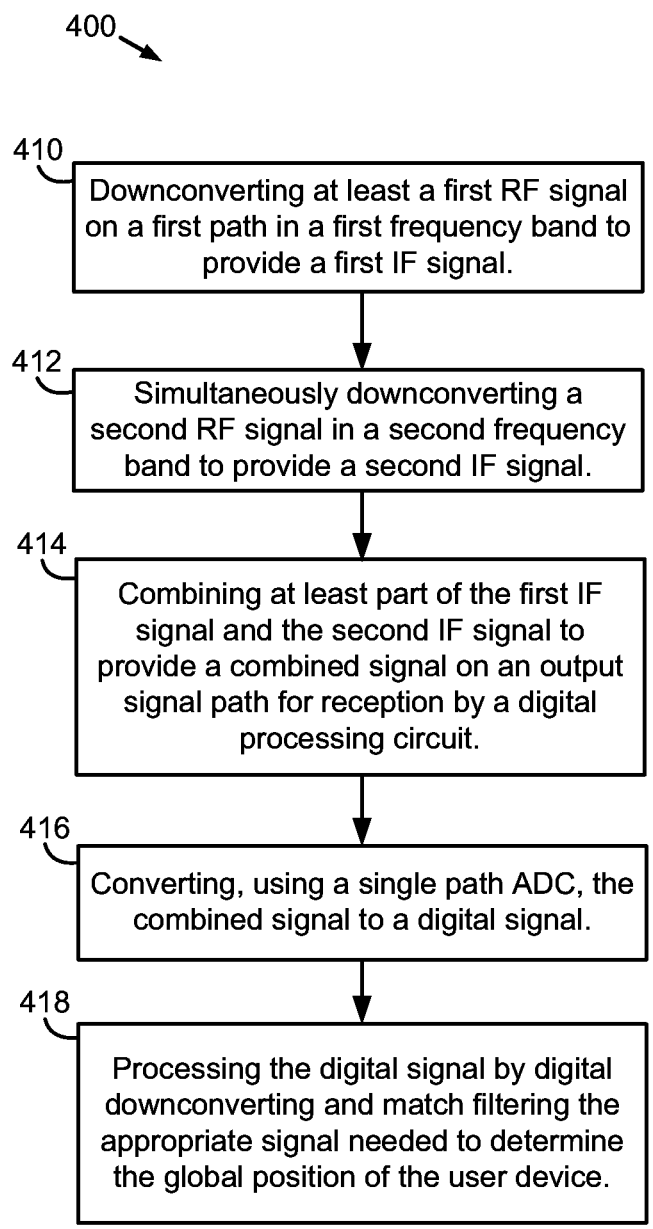
FIG. 5 is a flowchart of method steps for receiving and digitally processing a signal according to another exemplary embodiment.

FIG. 5 is a flow chart of method 400 for processing signals such as GNSS positional signals, according to an example embodiment. In one embodiment, the GNSS positional signals include one or more GPS signals. The method 400 includes a step 410 that may be implemented by the down converter 205 (FIG. 2a), mixers 243 and 244 (FIG. 2b), and mixers 283 and 284 (FIG. 2c). In step 410, at least a first RF signal on a first RF path (e.g., path 143) in a first frequency band is down converted to provide a first IF signal. At a step 412, a second RF signal on a second path (e.g., path 145) in a second frequency band is down converted to provide a second IF signal. The first frequency band may be different from the second frequency band. Step 412 may be implemented by down converter 205 (FIG. 2a), mixers 258 and 259 (FIG. 2b), or mixers 297 and 299 (FIG. 2c). The down conversion in steps 410 and 412 is performed to intersperse the first IF signal and the second IF signal in the frequency domain in one embodiment. The down conversion in steps 410 and 412 is performed simultaneously in one embodiment. One of the first IF signal or the second IF signal can be a ZIF, VLIF, or LIF signal in one embodiment.

At step 414, the combiners 214, 253, 292, 339 (FIGS. 2a-c) may combine at least part of the first IF signal and second IF signal to provide a combined signal on an output signal path (e.g. path 160) for reception by a digital processing circuit (e.g., processors 170, 271, 300). At step 416, the combined signal is converted to a digital signal using a single path ADC. At block 418, the baseband processors may process the digital signal by digital down converting and match filtering the appropriate signal that is needed to determine the global position of the user device.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or delivered over as one or more instructions or code on a computer-readable medium. Computer-readable media includes both computer storage media and communication media including any medium that facilitates transfer of a computer program from one place to another. A nontransitory storage media may be any available media that can be accessed by a computer. By way of example, and not limitation, such nontransitory computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for signal processing, comprising:
   down converting at least a first RF signal on a first path in a first frequency band to provide a first IF signal comprising a first I component signal and a first Q component signal;
   down converting at least a second RF signal on a second path in a second frequency band to provide a second IF signal comprising a second I component signal and a second Q component signal, wherein the first IF signal and the second IF signal are interspersed in the frequency domain, the first frequency band being different from the second frequency band;
   combining the first I component signal and the first Q component signal using a first polyphase filter to provide a third IF signal;
   combining the second I component signal and the second Q component signal using a second polyphase filter to provide a fourth IF signal; and
   combining at least part of the third IF signal and the fourth IF signal to provide a combined signal on an output signal path for reception by a digital processing circuit.

2. The method of claim 1, wherein the first IF signal comprises at least one of a Zero IF (ZIF), very low IF (VLIF), or Low IF (LIF) signal.

3. The method of claim 1, wherein the combined signal is provided on a single signal path.

4. The method of claim 1, wherein the first RF signal on the first path and the second RF signal on the second path are GNSS signals.

5. The method of claim 4, wherein the GNSS signals are signals from one or more of the following systems: a GPS, a GLONASS, a BeiDou system, and a Galileo system.

6. The method of claim 2, wherein the second IF signal is not a zero IF (ZIF), very low IF (VLIF), or low IF (LIF) signal.

7. The method of claim 1, wherein combining at least part of the third IF signal and the fourth IF signal comprises current mode combining at least part of the third IF signal and the fourth IF signal.

8. A method for signal processing, comprising:
   down converting at least a first RF signal on a first path in a first frequency band to provide a first IF signal comprising a first I component signal and a first Q component signal, wherein down converting the first RF signal comprises using a first pair of local oscillating signals;
   down converting at least a second RF signal on a second path in a second frequency band to provide a second IF signal comprising a second I component signal and a second Q component signal, wherein down converting the second RF signal comprises using a second pair of local oscillating signals and wherein the first IF signal and the second IF signal are interspersed in the frequency domain, the first frequency band being different from the second frequency band; and
   combining the first I component signal and the second I component signal to provide a first combined signal on an output signal path for reception by a digital signal processing circuit.

9. The method of claim 8, further comprising:
   combining the first Q component signal and the second Q component signal to provide a second combined signal for reception by the digital signal processing circuit.

10. A circuit, comprising:
    a down converter configured to:
       down convert a first RF signal on a first path in a first frequency band to provide a first IF signal comprising a first I component signal and a first Q component signal; and
       down convert a second RF signal on a second path in a second frequency band to provide a second IF signal comprising a second I component signal and a second Q component signal, wherein the first IF signal and the second IF signal are interspersed in the frequency domain, the first frequency band being different from the second frequency band;
    a first polyphase filter configured to combine the first I component signal and the first Q component signal to provide a third IF signal;
    a second polyphase filter for combining the second I component signal and the second Q component signal to provide a fourth IF signal;
    a combiner configured to combine at least part of the third IF signal and the fourth IF signal to provide a combined signal; and
    a driver configured to output the combined signal on an analog signal path.

11. The circuit of claim 10, wherein the analog signal path is connected to a digital signal processor.

12. The circuit of claim 10, wherein the first IF signal is a Zero IF (ZIF), very low IF (VLIF), or Low IF (LIF) signal.

13. The circuit of claim 10, wherein the first RF signal on the first path comprises at least one of: an L1, L2, GLONASS L1, GLONASS L2, L2C, E1, E2, E5a, E5b, and E6 signal; and wherein the second RF signal on the second path comprises at least one of: an L1, L2, R1, R2, L2C, E1, E2, E5a, E5b, and E6 signal.

14. The circuit of claim 10, wherein the analog signal path is a single signal path.

15. The circuit of claim 10, wherein the analog signal path includes a terminal of an integrated circuit.

16. The circuit of claim 10, wherein the first RF signal is down converted and filtered to provide the first I component signal and the first Q component signal, and wherein the second RF signal is down converted and filtered to provide the second I component signal and the second Q component signal.

17. The circuit of claim 10, wherein the combiner is a current mode combiner.

18. The circuit of claim 12, wherein the second IF signal is not a zero IF (ZIF), very low IF (VLIF), or low IF (LIF) signal.

19. A circuit comprising:
a down converter configured to:
down convert a first RF signal on a first path in a first frequency band to provide a first IF signal comprising a first I component signal and a first Q component signal, wherein the down converter includes a first pair of local oscillators configured to separate the first RF signal into the first I component signal and the first Q component signal; and
down convert a second RF signal on a second path in a second frequency band to provide a second IF signal comprising a second I component signal and a second Q component signal, wherein the down converter includes a second pair of local oscillators configured to separate the second RF signal into the second I component signal and the second Q component signal and wherein the first IF signal and the second IF signal are interspersed in the frequency domain, the first frequency band being different from the second frequency band;
a first combiner configured to combine the first I component signal and the second I component signal to provide a combined I component signal;
a second combiner configured to combine the first Q component signal and the second Q component signal to provide a combined Q component signal; and
drivers configured to output the combined I component signal and the combined Q component signal on an analog signal path.

* * * * *